United States Patent
Omori (10) Patent No.: US 8,997,175 B2
(45) Date of Patent: Mar. 31, 2015

(54) WIRELESS LAN COMMUNICATION TERMINAL AND COMMUNICATION CONTROL METHOD THEREOF IN WIRELESS LAN SYSTEM FOR THE SAME

(75) Inventor: Youko Omori, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 68 days.

(21) Appl. No.: 13/810,820

(22) PCT Filed: Jul. 15, 2011

(86) PCT No.: PCT/JP2011/004057
§ 371 (c)(1),
(2), (4) Date: Jan. 17, 2013

(87) PCT Pub. No.: WO2012/011264
PCT Pub. Date: Jan. 26, 2012

(65) Prior Publication Data
US 2013/0133029 A1    May 23, 2013

(30) Foreign Application Priority Data
Jul. 21, 2010  (JP) ................................ 2010-163597

(51) Int. Cl.
*H04W 12/08*   (2009.01)
*H04L 29/06*   (2006.01)
(Continued)

(52) U.S. Cl.
CPC .............. *H04W 12/08* (2013.01); *H04L 63/20* (2013.01); *H04W 76/023* (2013.01); *H04W 84/12* (2013.01); *H04W 84/047* (2013.01); *H04W 12/02* (2013.01)

USPC ............... 726/1; 713/156; 713/175; 380/270; 726/2; 726/5

(58) Field of Classification Search
USPC ............................................................ 726/1
See application file for complete search history.

(56) References Cited

U.S. PATENT DOCUMENTS 5,841,854 A * 11/1998 Schumacher et al. ... 379/265.11
6,795,444 B1 * 9/2004 Vo et al. ........................ 370/401
(Continued)

FOREIGN PATENT DOCUMENTS

JP  2008-035371 A   2/2008
JP  2008-219358 A   9/2008
(Continued)

*Primary Examiner* — Yonas Bayou
(74) *Attorney, Agent, or Firm* — Sughrue Mion, PLLC (57) ABSTRACT

A wireless LAN communication terminal and its communication control method are provided that make it possible to configure desired security between the terminal and an other-end terminal, without increasing power consumption of the terminals. The wireless LAN communication terminal (103) in a wireless LAN system including an access point (102), if the other-end terminal (101) has connected to the access point 102, acquires from the other-end terminal information about security functions the other-end terminal has and information about a current connection with the access point; compares the security function information and the connection information on the other-end terminal with its own security policy; selects, based on results of the comparisons, either a direct connection (106) with the other-end terminal or a relay connection (105) via the access point so that the security policy is met; and performs communication with the other-end terminal by using the selected connection.

12 Claims, 6 Drawing Sheets

(51) Int. Cl.
*H04W 76/02* (2009.01)
*H04W 84/12* (2009.01)
*H04W 84/04* (2009.01)
*H04W 12/02* (2009.01)

(56) References Cited

U.S. PATENT DOCUMENTS

| | | | |
|---|---|---|---|
| 8,284,765 B1* | 10/2012 | Kell et al. | 370/352 |
| 8,495,706 B2* | 7/2013 | Kanda | 726/2 |
| 2003/0026229 A1* | 2/2003 | Larson et al. | 370/338 |
| 2006/0079232 A1* | 4/2006 | Omori et al. | 455/436 |
| 2007/0008922 A1* | 1/2007 | Abhishek et al. | 370/329 |
| 2008/0025512 A1* | 1/2008 | Nakajima | 380/270 |
| 2008/0212508 A1* | 9/2008 | Morimoto et al. | 370/311 |
| 2009/0222659 A1* | 9/2009 | Miyabayashi et al. | 713/156 |
| 2009/0303934 A1* | 12/2009 | Abhishek et al. | 370/328 |
| 2010/0281525 A1* | 11/2010 | Nakajima | 726/5 |
| 2012/0314701 A1* | 12/2012 | Kell et al. | 370/352 |

FOREIGN PATENT DOCUMENTS

| | | |
|---|---|---|
| JP | 2008-219750 A | 9/2008 |
| JP | 2009-500969 A | 1/2009 |
| JP | 2009-212732 A | 9/2009 |
| JP | 2009-219051 A | 9/2009 |

* cited by examiner

WIRELESS LAN COMMUNICATION TERMINAL AND COMMUNICATION CONTROL METHOD THEREOF IN WIRELESS LAN SYSTEM FOR THE SAME

CROSS REFERENCE TO RELATED APPLICATIONS

This application is a National Stage of International Application No. PCT/JP2011/004057 filed Jul. 15, 2011, claiming priority based on Japanese Patent Application No. 2010-163597 filed Jul. 21, 2010, the contents of all of which are incorporated herein by reference in their entirety.

TECHNICAL FIELD

The present invention relates to a wireless LAN (Local Area Network) system and, more particularly, to a wireless LAN communication terminal and a communication control method thereof.

BACKGROUND ART

In a wireless LAN, since data is transmitted and received over radio, it is always a challenge to increase security, and several security standards are adopted in actuality. For example, TKIP (Temporal Key Integrity Protocol) is an encryption scheme that overcomes the vulnerability of previously used WEP (Wired Equivalent Privacy), and AES (Advanced Encryption Standard) is a standard employing a more robust encryption algorithm. In general, when communication is performed via a wireless LAN access point, a wireless communication terminal can configure security between itself and the access point by using a security function it supports.

However, even such a wireless LAN terminal equipped with a security function does not always require the same level of security. For example, it is required to configure a high level of security when the terminal is used in a wireless LAN environment outside an office, but a low level of security is enough in an internal wireless LAN. Therefore, wireless LAN systems are proposed that can change security settings depending on the place or environment where a terminal is used.

For example, according to a wireless LAN communication device disclosed in PTL 1, security setting information associated with each of individual access points is stored in a server, and when a wireless LAN communication terminal is wirelessly connected to an access point, the security level corresponding to that access point is set on the wireless LAN communication terminal.

{PTL 1} Japanese Patent Application Unexamined Publication No. 2008-219750

SUMMARY

Technical Problem

As described above, when communication is performed via an access point, a wireless LAN communication terminal can configure security between itself and the access point. However, the wireless LAN communication terminal cannot set a security level between the access point and a terminal on the other end of communication. Therefore, even if the other-end terminal has the capability of setting its security at the same level as that of the wireless LAN communication terminal, but if such an equivalent security level is not set on the other end, then it is impossible to perform communication with the other-end terminal at a required level of security.

Moreover, settings of security between the other-end terminal and the access point are determined when the other-end terminal has attached to the access point. Accordingly, when communication with the other-end terminal is started after completion of this attachment, the wireless LAN communication terminal cannot acquire knowledge of the settings of security set on the other-end terminal.

On the other hand, if the wireless LAN communication terminal directly connects to the other-end terminal, it is possible to directly configure security. In this case, however, the wireless LAN communication terminal operates as an access point, resulting in network control being more complicated than when the wireless LAN communication terminal simply connects as a terminal to an existing access point, causing a new problem of increasing power consumption.

Accordingly, an object of the present invention is to provide a wireless LAN communication terminal, as well as its communication control method, that makes it possible to configure desired security between the terminal and a terminal on the other end of communication, without increasing power consumption of the terminals.

Solution to Problem

A wireless LAN communication terminal in a wireless LAN (Local Area Network) system including at least one access point is characterized by comprising: an acquisition means that, when a wireless LAN communication terminal on another end of communication (hereinafter, referred to as other-end terminal) has connected to the access point, acquires from the other-end terminal security function information about security functions of the other-end terminal and current connection information about a current connection with the access point; a selection means that compares the security function information and the connection information on the other-end terminal with a security policy of its own terminal and, based on results of the comparisons, selects either a direct connection with the other-end terminal or a relay connection via the access point so that the security policy is met; and a communication means that performs communication with the other-end terminal by using the selected connection.

A communication control method for a wireless LAN communication terminal in a wireless LAN (Local Area Network) system including at least one access point is characterized by comprising: by an acquisition means, when a wireless LAN communication terminal on another end of communication (hereinafter, referred to as other-end terminal) has connected to the access point, acquires from the other-end terminal security function information about security functions of the other-end terminal and current connection information about a current connection with the access point; by a selection means, comparing the security function information and the connection information on the other-end terminal with a security policy of its own terminal and, based on results of the comparisons, selecting either a direct connection with the other-end terminal or a relay connection via the access point so that the security policy is met; and by a communication means, performing communication with the other-end terminal by using the selected connection.

According to the present invention, it is possible to configure desired security between a terminal and a terminal on the other end of communication, without increasing power consumption of the terminals.

DETAILED DESCRIPTION OF EMBODIMENTS

Hereinafter, to avoid complication, a simplified wireless LAN system will be illustrated. Specifically, a description will be given of a case as an example in which a wireless LAN terminal starts communication with another wireless LAN terminal that has already attached to an access point (AP). However, the present invention is not limited to this example but can be applied to a system in which a plurality of access points can communicate through a network, as long as terminals can directly communicate with each other. Additionally, for security functions with different levels of security, already-described WEP, TKIP, and AES are used as an example, but the present invention is not limited to these.

1. First Exemplary Embodiment 1.1) System

Figure 1:
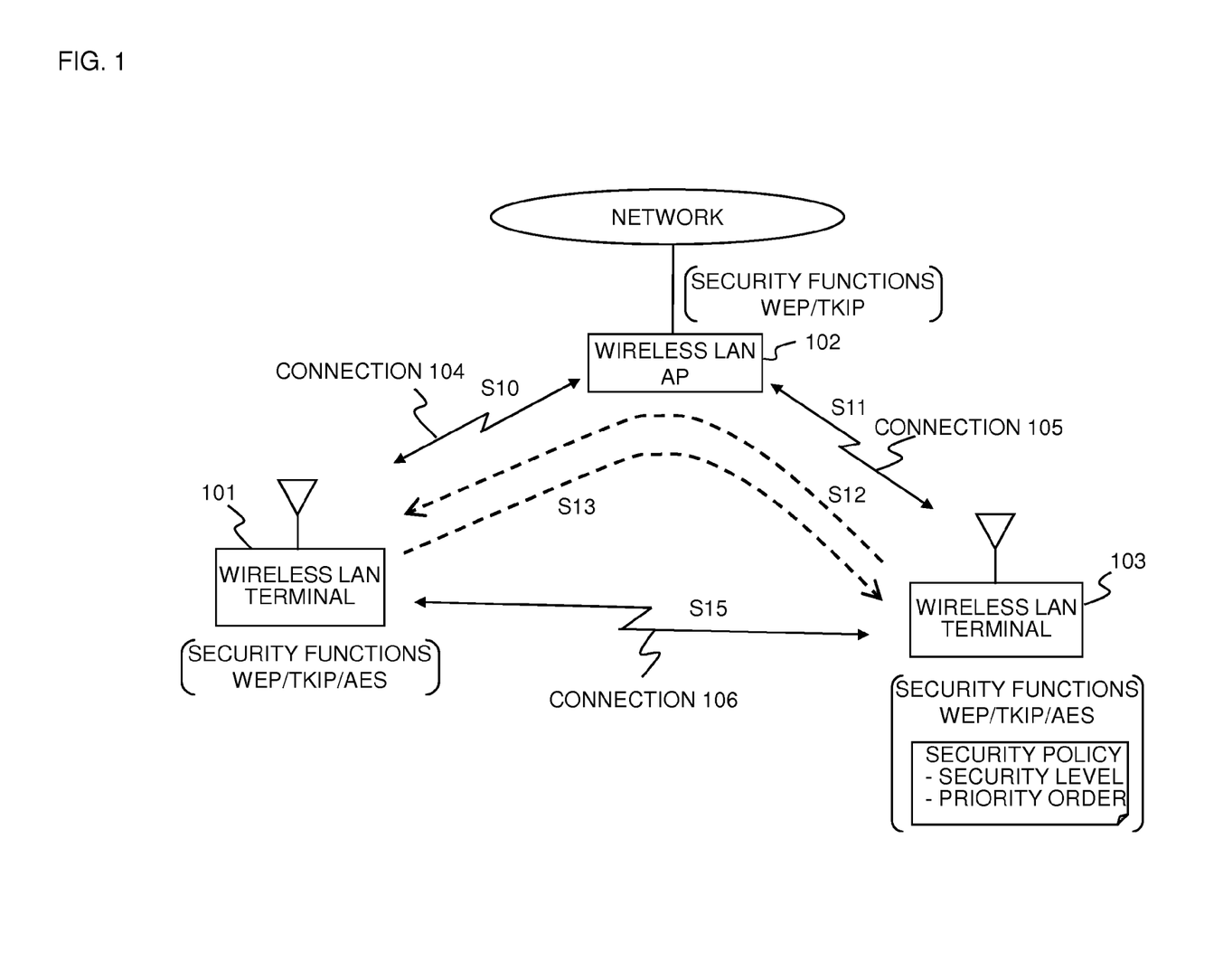
FIG. 1 is a schematic system structure diagram showing a schematic structure of a wireless LAN system and a communication control procedure according to a first exemplary embodiment of the present invention.

Referring to FIG. 1, in a wireless LAN system according to a first exemplary embodiment of the present invention, it is assumed that a wireless LAN terminal 101 has connected to a wireless LAN access point 102 and that a wireless LAN terminal 103 starts communication with this wireless LAN terminal 101.

It is assumed that the wireless LAN terminal 101 is equipped with security functions with different levels of security, WEP, TKIP, and AES; that the access point 102 is equipped with the security functions WEP and TKIP; and that the wireless LAN terminal 103 is equipped with the security functions WEP, TKIP, and AES. The levels of security rise in the order of WEP<TKIP<AES. It is assumed that a connection 104 between the wireless LAN terminal 101 and the access point 102 is set up by using the security function WEP.

Moreover, for a security policy, a predetermined level of security (for example, a level not lower than that of TKIP) and a priority order of securities to use are preset on the wireless LAN terminal 103. Communication using TKIP or AES as a predetermined security is set such that a security function with a higher (or lower) level has a higher priority if both of TKIP and AES can be used, for example. Here, it is assumed that the communication is set to select a higher level of security, so that AES, not TKIP, is preferentially used.

1.2) Operation

Figure 2:
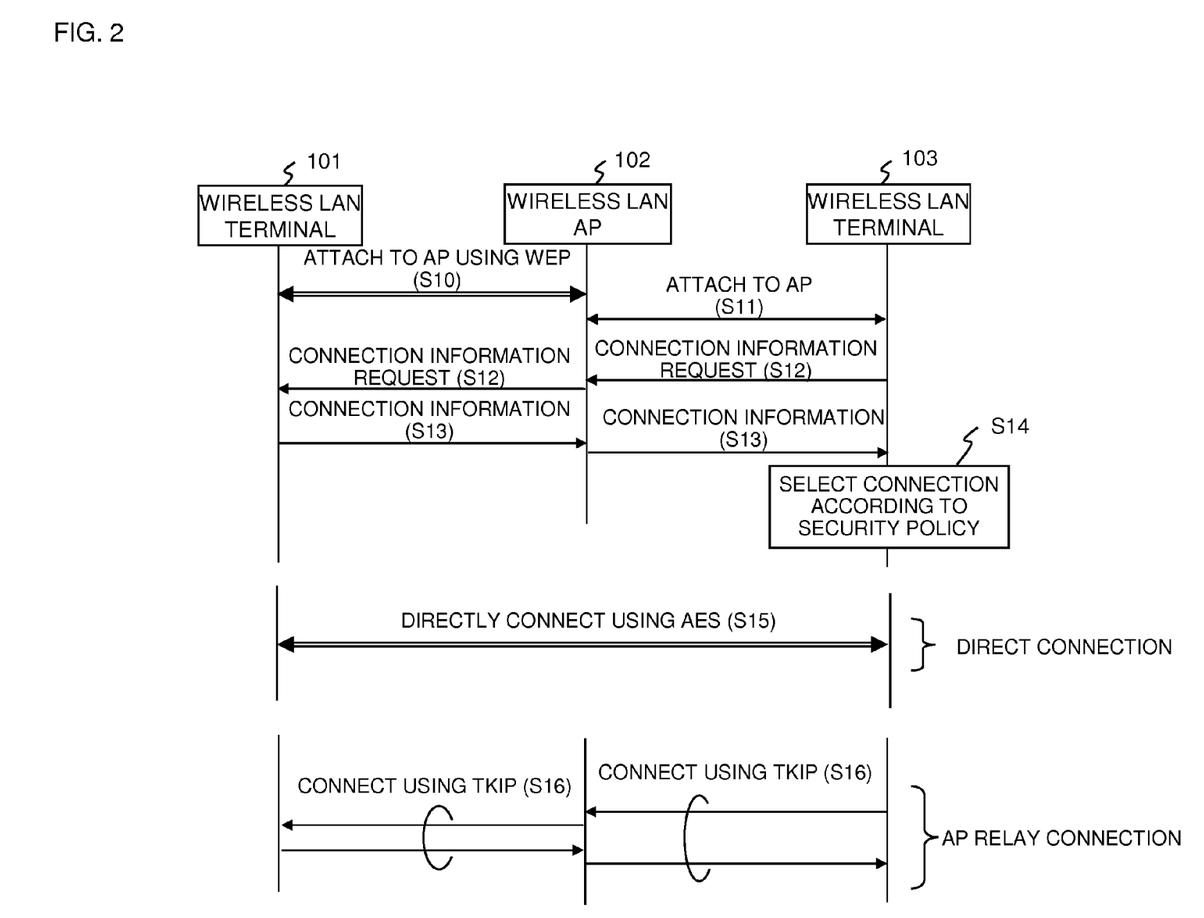
FIG. 2 is a sequence diagram showing an example of the communication control procedure in the system shown in FIG. 1.

Next, a communication control procedure in the present exemplary embodiment will be described with reference to FIGS. 1 and 2.

First, as described above, the connection 104 between the wireless LAN terminal 101 and the access point 102 is set up by using WEP (Step S10). When starting communication with the wireless LAN terminal 101, the wireless LAN terminal 103 first attaches to the access point 102 (Step S11). Subsequently, the wireless LAN terminal 103 makes a request to the wireless LAN terminal 101 via the access point 102 for connection information including security functions and current connection settings (Step S12).

In response to this request for connection information, the wireless LAN terminal 101 sends back the requested connection information to the wireless LAN terminal 103 via the access point 102 (Step S13). The connection information includes information about the security functions that the terminal itself is equipped with (here, WEP, TKIP, and AES) and information about the current connection settings made with the access point 102 (here, WEP is used).

The wireless LAN terminal 103 compares the security function information and the current connection setting information received from the wireless LAN terminal 101 with its own security policy, determines which case meets a required level of security, a case of direct connection with the wireless LAN terminal 101 or a case of relay connection via the access point 102, and selects a connection that meets the security policy (Step S14). Here, since the security policy is set to preferentially select AES with the higher level of security between TKIP and AES, the security function information on the wireless LAN terminal 101 includes WEP, TKIP, and AES, and the current connection settings with the access point 102 is made using WEP, therefore the direct connection is selected to meet the security policy, so that AES is used for a connection 106 with the wireless LAN terminal 101 (Step S15).

If the connection 104 between the wireless LAN terminal 101 and the access point 102 is set up by using, for example, TKIP in Step S10, the current connection 104 meets the security policy, and therefore the wireless LAN terminal 103 selects the relay connection via a connection 105 and the connection 104, that is, via the access point 102.

1.3) Effects

As described above, according to the present exemplary embodiment, when a wireless LAN terminal connects to another wireless LAN terminal that has connected to an access point, the wireless LAN terminal refers to information about the existing connection with the access point and selects a connection method. Specifically, the terminal acquires information about security between the other terminal and the access point and security functions of the other terminal, and compares the level of security via the access point (AP relay connection) and the level of security in a case where the terminal itself operates as an access point (direct connection), with its own security policy. Based on results of these comparisons, any one of the AP relay connection and the direct connection is selected, whereby it is possible to set up a connection at a required level, among settable levels of security. Thus, it is possible to select an optimum connection method in terms of power saving, while securing a required level of security.

2. First Example 2.1) Communication Control

Next, a communication control method for a wireless LAN terminal according to a first example of the present invention will be described in detail with reference to FIG. 3. Note that a wireless LAN terminal in this example corresponds to the wireless LAN terminal 103 in FIG. 1 and is assumed to include a wireless communication section for performing direct wireless communication with an access point 102 or a wireless LAN terminal 101 on the other end of communication and a control section or a program-controlled processor that performs communication control, which will be described below. (Detailed description will be given later with reference to FIG. 6.)

Figure 3:
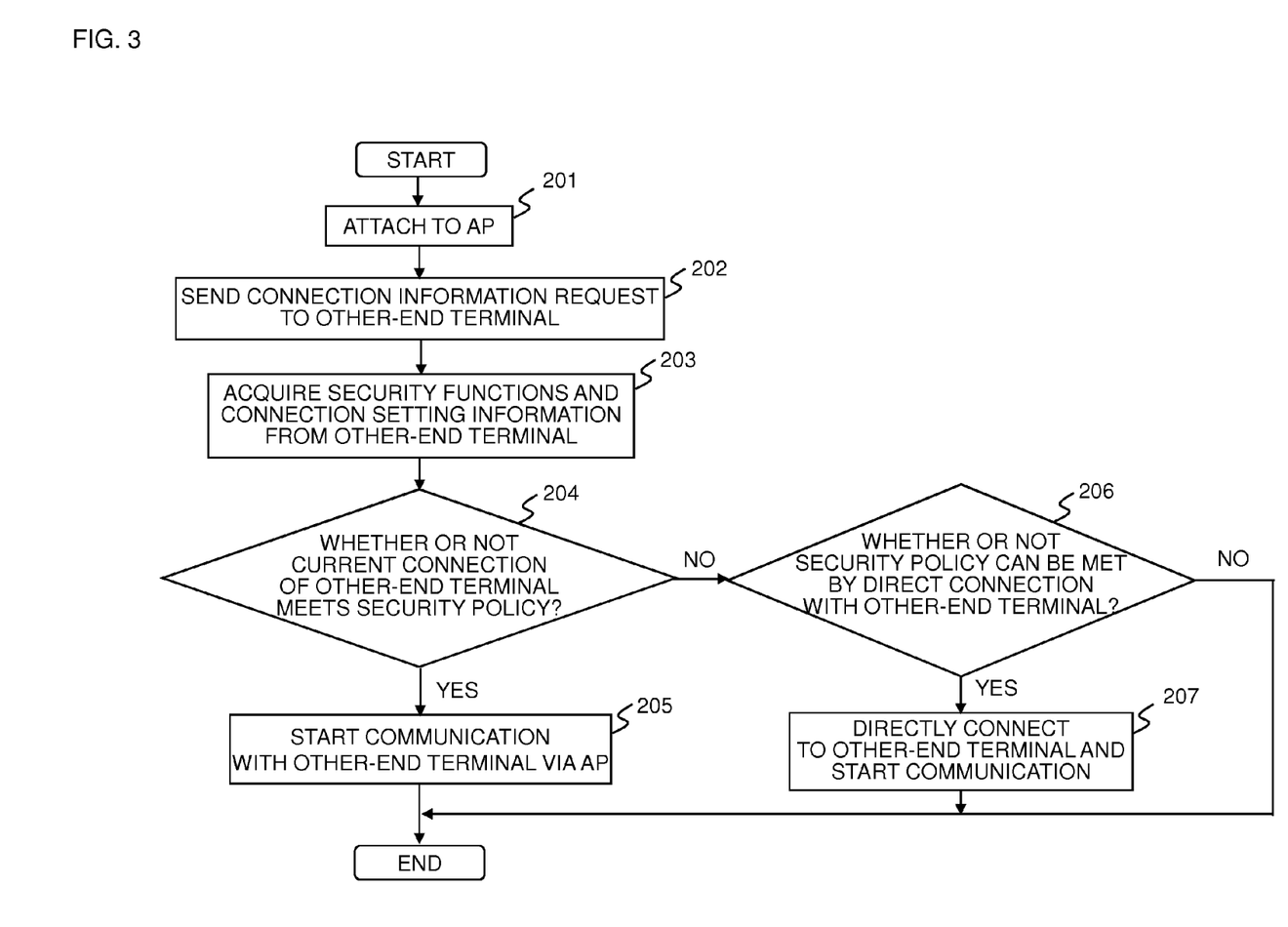
FIG. 3 is a flowchart showing a communication control method for a wireless LAN communication terminal according to a first example of the present invention.

Referring to FIG. 3, when starting communication with the wireless LAN terminal 101 on the other end of communication (hereinafter, referred to as other-end terminal), the control section of the wireless LAN terminal 103 first attaches to the access point 102 (Step 201). Subsequently, the control section sends to the other-end terminal 101, through the wireless communication section, a request for connection information including security function information and current connection setting information (Step 202) and acquires, as a response thereto, the security function information and the current connection setting information from the other-end terminal 101 (Step 203).

Subsequently, the control section determines based on the current connection setting information on the other-end terminal 101 whether or not the level of security of a connection 104 meets the security policy of its own terminal (Step 204). If the current connection 104 of the other-end terminal 101 has a level of security meeting the security policy of its own terminal (Step 204: YES), the control section selects a relay connection via the access point 102 because the current connection 104 via the access point 102 meets the security policy, and then establishes a connection 106 with the access point 102 and starts communication with the other-end terminal (Step 205).

On the other hand, if the current connection 104 of the other-end terminal 101 does not meet the security policy of its own terminal (Step 204: NO), the control section determines based on the security function information on the other-end terminal 101 whether or not the security policy is met if a direct connection is made with the other-end terminal 101 (Step 206). In other words, based on the information on security functions that the other-end terminal 101 is equipped with, it is determined whether or not security between its own terminal and the other-end terminal 101 can be directly raised to a level meeting the security policy. Specifically, although the other-end terminal 101 has connected to the access point 102 through the connection 104 using WEP, it supports WEP, TKIP, and AES in terms of security function. Accordingly, it is possible to establish a connection using AES, by the wireless LAN terminal 103 itself serving as an access point and directly connecting to the other-end terminal 101. Therefore, the wireless LAN terminal 103 establishes a connection 106 and starts direct communication with the other-end terminal 101 by using AES (Step 207). Alternatively, if the other-end terminal 101 has a function of operating as an access point, it is also possible that the wireless LAN terminal 103 requests the other-end terminal 101 to operate as an access point and establishes a connection using AES that has a required level of security.

2.2) Effects

As described above, according to the present example, when the level of security between the other-end terminal 101 and the access point 102 meets a level the terminal 103 requires, communication with the other-end terminal 101 is performed via the access point 102, whereby the terminal itself need not operate as an access point. Moreover, if the level of security between the other-end terminal 101 and the access point 102 does not meet a level the terminal 103 requires, direct communication with the other-end terminal 101 is performed, whereby it is possible to secure the level of security.

In this manner, the necessity or unnecessity of direct communication can be checked by examining conditions of the existing connection between the other-end terminal 101 and the access point 102, whereby it is possible to perform communication at a required level of security with reduced power consumption.

3. Second Example 3.1) Communication Control

Next, a communication control method for a wireless LAN terminal according to a second example of the present invention will be described in detail with reference to FIG. 4. Note that a wireless LAN terminal in this example corresponds to the wireless LAN terminal 103 in FIG. 1 and is assumed to include a wireless communication section for performing direct wireless communication with an access point 102 or a wireless LAN terminal 101 on the other end of communication and a control section or a program-controlled processor that performs communication control, which will be described below. (Detailed description will be given later with reference to FIG. 6.) Moreover, in the present example, it is assumed that the priority order of securities is not particularly determined in the security policy of the wireless LAN terminal 103 and that it is enough to be able to perform communication by using any one of AES and TKIP.

Figure 4:
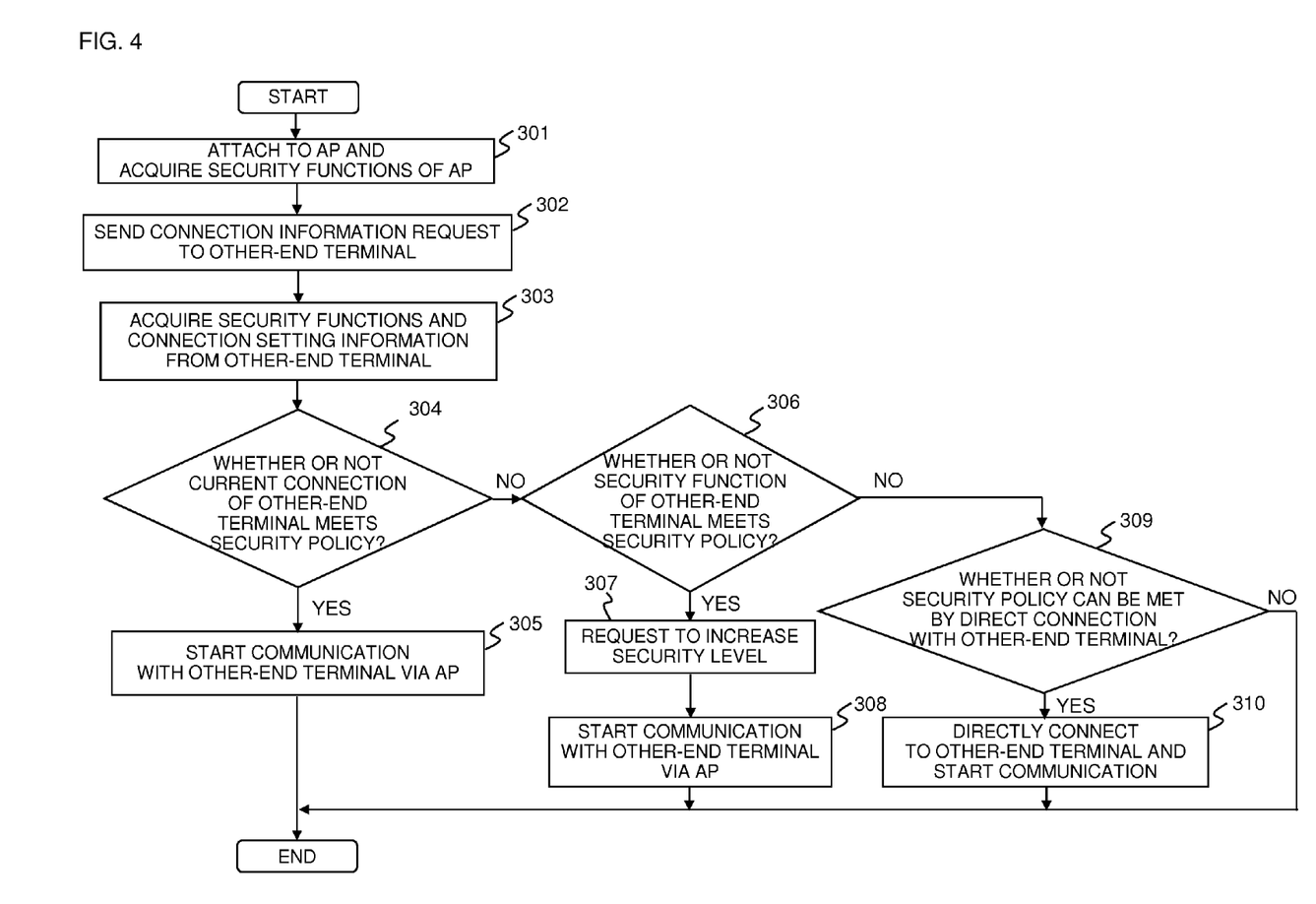
FIG. 4 is a flowchart showing a communication control method for a wireless LAN communication terminal according to a second example of the present invention.

Referring to FIG. 4, when starting communication with the other-end terminal 101, the control section of the wireless LAN terminal 103 first attaches to the access point 102 and, at that time, acquires security functions (here, WEP and TKIP) of the access point 102 (Step 301). Subsequently, the control section sends to the other-end terminal 101, through the wireless communication section, a request for connection information including security function information and current connection setting information (Step 302) and acquires, as a response thereto, the security function information and the current connection setting information from the other-end terminal 101 (Step 303).

Subsequently, the control section determines based on the current connection setting information on the other-end terminal 101 whether or not the level of security of a connection 104 meets the security policy of its own terminal (Step 304). If the current connection 104 of the other-end terminal 101 has a level of security meeting the security policy of its own terminal (Step 304: YES), the control section selects a relay connection via the access point 102 because the current connection 104 via the access point 102 meets the security policy, and then establishes a connection 106 with the access point 102 and starts communication with the other-end terminal 101 (Step 305).

On the other hand, if the current connection 104 of the other-end terminal 101 does not meet the security policy of its own terminal (Step 304: NO), the control section determines whether or not the security policy can be met if the levels of security of the connection 104 and a connection 105 are raised (Step 306). If it can be met (Step 306: YES), the control section requests the other-end terminal 101 to connect to the access point 102 by using higher security (Step 307) so as to achieve a condition in which the current connection 104 meets the security policy, and then selects a relay connection via the access point 102, establishes a connection 106 with the access point 102, and starts communication with the other-end terminal 101 (Step 308).

If the levels of security of the connections 104 and 105 cannot be raised (Step 306: NO), the control section determines based on the security function information on the other-end terminal 101 whether or not communication meeting the security policy can be performed if a direct connection is made with the other-end terminal 101 (Step 309). In other words, based on the information on security functions that the other-end terminal 101 is equipped with, it is determined whether or not security between its own terminal and the other-end terminal 101 can be directly raised to a level meeting the security policy. Specifically, although the other-end terminal 101 has connected to the access point 102 through the connection 104 using WEP, it supports WEP, TKIP, and AES in terms of security function. Accordingly, it is possible to establish a connection using AES, by the wireless LAN terminal 103 itself serving as an access point and directly connecting to the other-end terminal 101. Therefore, the control section of the wireless LAN terminal 103 establishes a connection 106 using AES and starts direct communication with the other-end terminal 101 (Step 310). Alternatively, if the other-end terminal 101 has a function of operating as an access point, it is also possible that the wireless LAN terminal 103 requests the other-end terminal 101 to operate as an access point and establishes a connection using AES that has a required level of security.

3.2) Effects

As described above, according to the present example, when the level of security between the other-end terminal 101 and the access point 102 does not meet a level the terminal 103 requires, it is determined before direct communication with the other-end terminal 101 whether or not the level of security between the other-end terminal 101 and the access point 102 can be raised. If the security can be raised, the terminal 103 or the other-end terminal 101 need not operate as an access point, and communication between the terminals can be performed through a relay connection meeting the security policy. Thereby, power consumption of the terminals can be further suppressed.

4. Second Exemplary Embodiment

In the above-described first exemplary embodiment, the information about the security of the other-end terminal 101 is acquired via the access point, but the present invention is not limited to this. According to a second exemplary embodiment of the present invention, it is also possible to acquire similar connection information through a communication means other than a wireless LAN.

Figure 5:
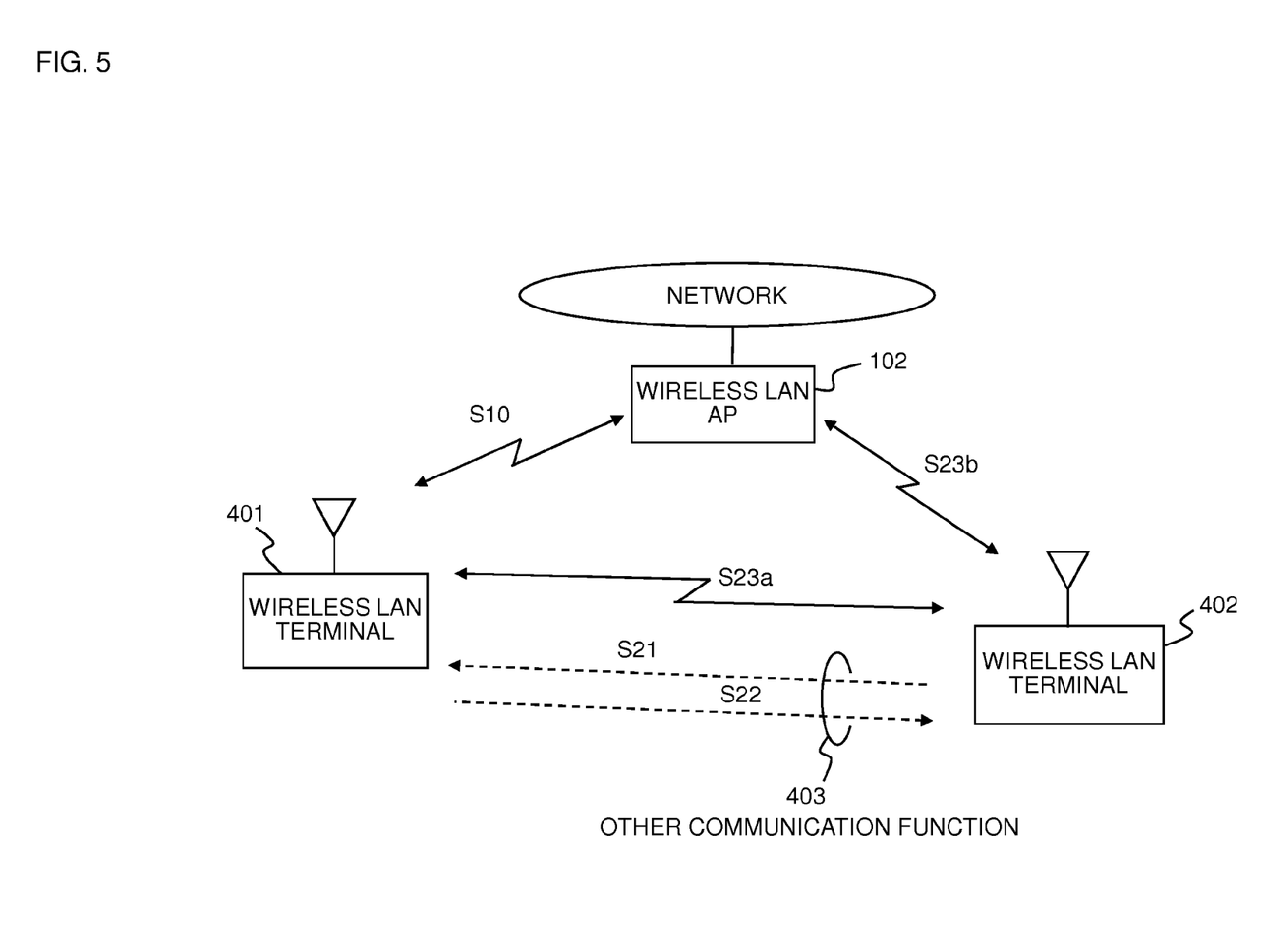
FIG. 5 is a schematic system structure diagram showing a schematic structure of a wireless LAN system and a communication control procedure according to a second exemplary embodiment of the present invention.

In a wireless LAN system according to the second exemplary embodiment of the present invention shown in FIG. 5, blocks having functions similar to those of the system shown in FIG. 1 are denoted by the same reference signs as in FIG. 1. It is assumed that wireless LAN terminals 401 and 402 each have a communication function 403 different from a wireless LAN communication function and can communicate with each other. For the different communication function 403, for example, short-distance wireless communication functionality NFC (Near Field Communication) or the like can be used. Alternatively, another conceivable method is that a two-dimensional bar code is displayed on a screen of the other-end terminal 401 and is shot by using a camera of the terminal 402, whereby information is acquired.

As described above, WEP is used for a connection 104 between the other-end terminal 401 and an access point 102 (Step S10). When starting communication with the other-end terminal 401, the terminal 402 sends a request for connection information by using NFC or the like (Step 21), and the other-end terminal 401, in response thereto, sends back the connection information (Step S22). The terminal 402 thus can acquire security function information and current connection setting information on the other-end terminal 401.

The terminal 402 compares the security function information and the current connection setting information received from the other-end terminal 401, with its own security policy, determines which case meets a required level of security, a case of direct connection with the other-end terminal 401 or a case of relay connection via the access point 102, and selects a connection meeting the security policy (Step S23a or S23b).

As described above, according to the present exemplary embodiment, required information is acquired from the other-end terminal 401 by using an information acquisition means other than a wireless LAN. If the level of security between the other-end terminal 401 and the access point 102 is lower than a level the terminal 402 requires, the level of security can be secured by directly communicating with the other-end terminal 401 as described already. In this manner, the necessity or unnecessity of direct communication can be checked by examining conditions of the existing connection between the other-end terminal 401 and the access point 102, whereby it is possible to perform communication at a required level of security with reduced power consumption.

5. Wireless LAN Terminal

Hereinafter, an example of a configuration of a wireless LAN terminal that can implement the above-described examples will be described with reference to FIG. 6.

Figure 6:
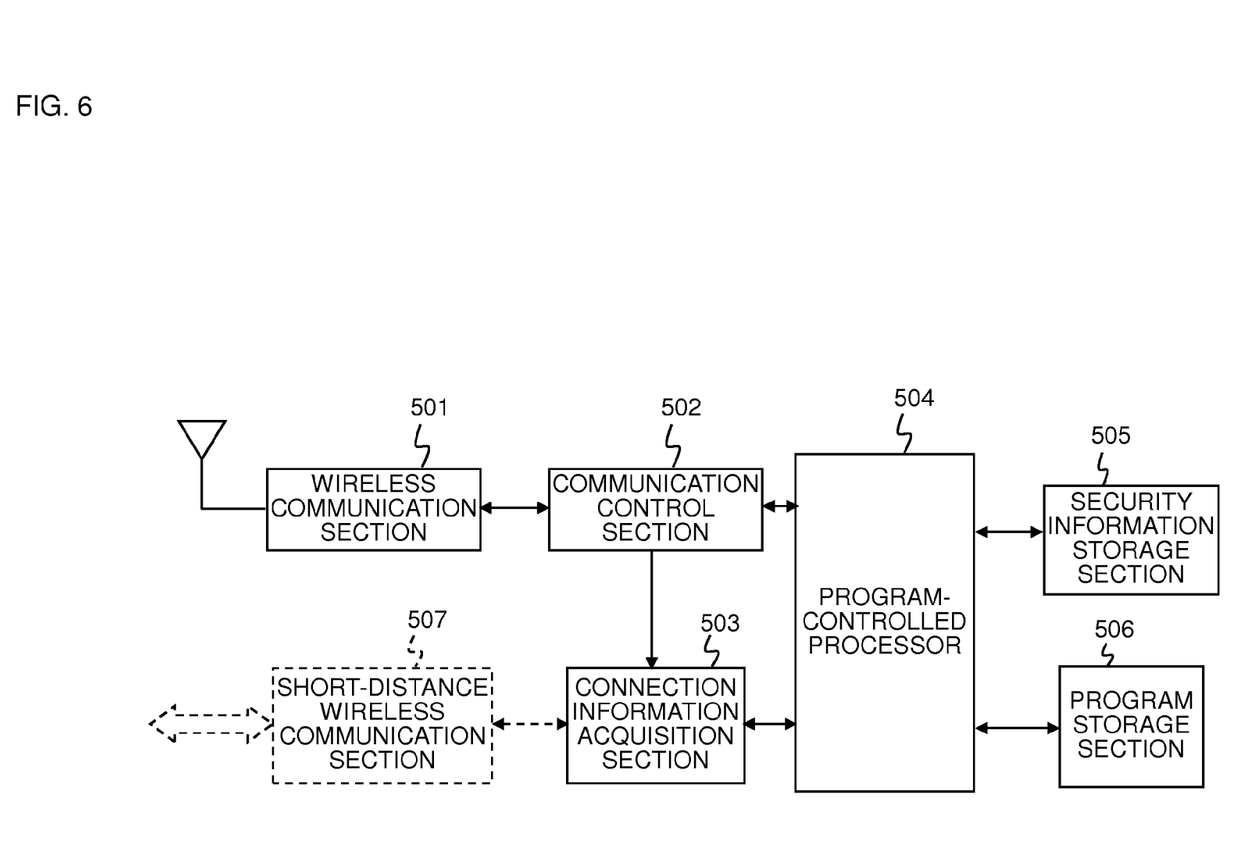
FIG. 6 is a block diagram showing a schematic configuration of a wireless LAN communication terminal usable in the systems shown in FIGS. 2 and 5.

Referring to FIG. 6, the wireless LAN terminal includes a wireless communication section 501 for wireless LAN communication and a communication control section 502, and further includes a connection information acquisition section 503 including a function of acquiring security function information and current connection setting information from an other-end terminal 101 as described above. A program-controlled processor 504 such as CPU (Central Processing Unit) controls the communication control section 502, the connection information acquisition section 503, and a security information storage section 505 as shown in FIG. 3 or 4.

A security policy as described above is registered beforehand with the security information storage section 505 and is compared with the security function information and the current connection setting information on the other-end terminal 101 acquired by the connection information acquisition section 503, whereby any one of an AP relay connection and a direct connection can be selected depending on results of the comparisons as shown in FIG. 3 or 4. Such a communication control function can be implemented by executing a program stored in a program storage section 506, on the program-controlled processor 504. Note that the security information storage section 505 and the program storage section 506 may be discrete storage media or may be detachably attached to the wireless LAN terminal.

Incidentally, in case of a wireless LAN terminal using the short-distance wireless communication functionality NFC as described in the second exemplary embodiment, a short-distance wireless communication section 507 is connected to the connection information acquisition section 503, and the security function information and the current connection setting information are acquired from the other-end terminal 101.

As described above, when the level of security on the other-end terminal side meets a level the security policy requires, the program-controlled processor 504 controls the communication control section 502 to select a relay connection via the access point 102, whereby the communication control section 502 need not operate as an access point. Moreover, if the level of security on the other end does not meet a level the security policy requires, the terminal itself or the other-end terminal operates as an access point to perform direct communication with the other end, whereby it is possible to secure the level of security. In this manner, the necessity or unnecessity of direct communication can be checked by examining conditions of the existing connection on the other end, whereby it is possible to perform communication at a required level of security with reduced power consumption.

6. Additional Statements

All or part of the above-described exemplary embodiments also can be described as the following statements, but the present invention is not limited to these.

(Additional Statement 1)

A wireless LAN communication terminal in a wireless LAN (Local Area Network) system including at least one access point, characterized by comprising:

an acquisition means that, when a wireless LAN communication terminal on another end of communication (hereinafter, referred to as other-end terminal) has connected to the access point, acquiring from the other-end terminal security function information about security functions of the other-end terminal and current connection information about a current connection with the access point;

a selection means that compares the security function information and the connection information on the other-end terminal with a security policy of its own terminal and, based on results of the comparisons, selects either a direct connection with the other-end terminal or a relay connection via the access point so that the security policy is met; and a communication means that performs communication with the other-end terminal by using the selected connection.

(Additional Statement 2)

The wireless LAN communication terminal according to additional statement 1, characterized in that when the current connection information meets the security policy, the selection means selects the relay connection and, when the current connection information does not meet the security policy, selects the direct connection or the relay connection using one of the security functions of the other-end terminal that meets the security policy.

(Additional Statement 3)

The wireless LAN communication terminal according to additional statement 2, characterized in that when the connection information does not meet the security policy, the relay connection is selected, using those of security functions of the access point and the security functions of the other-end terminal that meet the security policy.

(Additional Statement 4)

The wireless LAN communication terminal according to any one of additional statements 1 to 3, characterized in that the communication means, in case of the direct connection, causes its own terminal to function as a wireless LAN access point or requests the other-end terminal to function as a wireless LAN access point.

(Additional Statement 5)

The wireless LAN communication terminal according to any one of additional statements 1 to 4, characterized in that the acquisition means acquires the security function information and the connection information on the other-end terminal through the access point or through another communication means different from the wireless LAN system.

(Additional Statement 6)

A communication control method for a wireless LAN communication terminal in a wireless LAN (Local Area Network) system including at least one access point, characterized by comprising:

by an acquisition means, when a wireless LAN communication terminal on another end of communication (hereinafter, referred to as other-end terminal) has connected to the access point, acquiring from the other-end terminal security function information about security functions of the other-end terminal and current connection information about a current connection with the access point;

by a selection means, comparing the security function information and the connection information on the other-end terminal with a security policy of its own terminal and, based on results of the comparisons, selecting either a direct connection with the other-end terminal or a relay connection via the access point so that the security policy is met; and by a communication means, performing communication with the other-end terminal by using the selected connection.

(Additional Statement 7)

The communication control method according to additional statement 6, characterized in that when the current connection information meets the security policy, the selection means selects the relay connection and, when the current connection information does not meet the security policy, selects the direct connection or the relay connection using one of the security functions of the other-end terminal that meets the security policy.

(Additional Statement 8)

The communication control method according to additional statement 7, characterized in that when the connection information does not meet the security policy, the relay connection is selected, using those of security functions of the access point and the security functions of the other-end terminal that meet the security policy.

(Additional Statement 9)

The communication control method according to any one of additional statements 6 to 8, characterized in that the communication means, in case of the direct connection, causes its own terminal to function as a wireless LAN access point or requests the other-end terminal to function as a wireless LAN access point.

(Additional Statement 10)

The communication control method according to any one of additional statements 6 to 9, characterized in that the acquisition means acquires the security function information and the connection information on the other-end terminal through the access point or through another communication means different from the wireless LAN system.

(Additional Statement 11)

A wireless LAN (Local Area Network) system including at least one access point and a plurality of wireless LAN communication terminals, characterized in that a wireless LAN communication terminal includes:

an acquisition means that, when a wireless LAN communication terminal on another end of communication (hereinafter, referred to as other-end terminal) has connected to the access point, acquiring from the other-end terminal security function information about security functions of the other-end terminal and current connection information about a current connection with the access point;

a selection means that compares the security function information and the connection information on the other-end terminal with a security policy of its own terminal and, based on results of the comparisons, selects either a direct connection with the other-end terminal or a relay connection via the access point so that the security policy is met; and a communication means that performs communication with the other-end terminal by using the selected connection.

(Additional Statement 12)

The wireless LAN system according to additional statement 11, characterized in that when the current connection information meets the security policy, the selection means selects the relay connection and, when the current connection information does not meet the security policy, selects the direct connection or the relay connection using one of the security functions of the other-end terminal that meets the security policy.

(Additional Statement 13)

The wireless LAN system according to additional statement 12, characterized in that when the connection information does not meet the security policy, the relay connection is selected, using those of security functions of the access point and the security functions of the other-end terminal that meet the security policy.

(Additional Statement 14)

The wireless LAN system according to any one of additional statements 11 to 13, characterized in that the communication means, in case of the direct connection, causes its own terminal to function as a wireless LAN access point or requests the other-end terminal to function as a wireless LAN access point.

(Additional Statement 15)

The wireless LAN system according to any one of additional statements 11 to 14, characterized in that the acquisition means acquires the security function information and the connection information on the other-end terminal through the access point or through another communication means different from the wireless LAN system.

(Additional Statement 16)

A program causing a program-controlled processor of a wireless LAN communication terminal in a wireless LAN (Local Area Network) system including at least one access point, to function as a wireless LAN communication terminal that includes:

an acquisition function that, when a wireless LAN communication terminal on another end of communication (hereinafter, referred to as other-end terminal) has connected to the access point, acquiring from the other-end terminal security function information about security functions of the other-end terminal and current connection information about a current connection with the access point;

a selection function that compares the security function information and the connection information on the other-end terminal with a security policy of its own terminal and, based on results of the comparisons, selects either a direct connection with the other-end terminal or a relay connection via the access point so that the security policy is met; and a communication function that performs communication with the other-end terminal by using the selected connection.

(Additional Statement 17)

The program according to additional statement 16, characterized in that when the current connection information meets the security policy, the selection means selects the relay connection and, when the current connection information does not meet the security policy, selects the direct connection or the relay connection using one of the security functions of the other-end terminal that meets the security policy.

(Additional Statement 18)

The program according to additional statement 17, characterized in that when the connection information does not meet the security policy, the relay connection is selected, using those of security functions of the access point and the security functions of the other-end terminal that meet the security policy.

(Additional Statement 19)

The program according to any one of additional statements 16 to 18, characterized in that the communication means, in case of the direct connection, causes its own terminal to function as a wireless LAN access point or requests the other-end terminal to function as a wireless LAN access point.

(Additional Statement 20)

The program according to any one of additional statements 16 to 19, characterized in that the acquisition means acquires the security function information and the connection information on the other-end terminal through the access point or through another communication means different from the wireless LAN system.

INDUSTRIAL APPLICABILITY

The present invention can be supplied to wireless LAN terminals, in particular, to a system using a wireless LAN as a short-distance communication method.

REFERENCE SIGNS LIST 101, 103, 401, 402 Wireless LAN terminal
102 Access point
104, 105, 106 Connection
501 Wireless communication section
502 Communication control section
503 Connection information acquisition section
504 Program-controlled processor
505 Security information storage section
506 Program storage section

The invention claimed is:

1. A wireless LAN communication terminal in a wireless LAN (Local Area Network) system including at least one access point, comprising:

an acquisition section that, when an other-end wireless LAN communication terminal on another end of communication has connected to the access point, acquires from the other-end terminal security function information about security functions of the other-end terminal and current connection information about a current connection between the other-end terminal and the access point;

a selection section that compares the security function information and the current connection information on the other-end terminal with a security policy of its own terminal and, based on results of the comparisons, selects either a direct connection with the other-end terminal or a relay connection via the access point so that the security policy is met, wherein the relay connection includes the current connection and wherein when the current connection information meets the security policy, the selection section selects the relay connection and, when the current connection information does not meet the security policy, selects the direct connection or the relay connection using one of the security functions of the other-end terminal that meets the security policy; and a communication section that performs communication with the other-end terminal by using a selected connection.

2. The wireless LAN communication terminal according to claim 1, wherein when the current connection information does not meet the security policy, the relay connection is selected, using those of security functions of the access point and the security functions of the other-end terminal that meet the security policy.

3. The wireless LAN communication terminal according to claims 1, wherein the communication section, in case of the direct connection, causes its own terminal to function as a wireless LAN access point or requests the other-end terminal to function as a wireless LAN access point.

4. The wireless LAN communication terminal according to claim 1, wherein the acquisition section acquires the security function information and the connection information on the other-end terminal through the access point or through another communication section different from the wireless LAN system.

5. A communication control method for a wireless LAN communication terminal in a wireless LAN (Local Area Network) system including at least one access point, comprising:
by an acquisition section, when an other-end wireless LAN communication terminal on another end of communication has connected to the access point, acquiring from the other-end terminal security function information about security functions of the other-end terminal and current connection information about a current connection between the other-end terminal and the access point;
by a selection section, comparing the security function information and the current connection information on the other-end terminal with a security policy of its own terminal and, based on results of the comparisons, selecting either a direct connection with the other-end terminal or a relay connection via the access point so that the security policy is met, wherein the relay connection includes the current connection and wherein when the current connection information meets the security policy, the selection section selects the relay connection and, when the current connection information does not meet the security policy, selects the direct connection or the relay connection using one of the security functions of the other-end terminal that meets the security policy; and
by a communication section, performing communication with the other-end terminal by using the selected connection.

6. The communication control method according to claim 5, wherein when the current connection information does not meet the security policy, the relay connection is selected, using those of security functions of the access point and the security functions of the other-end terminal that meet the security policy.

7. The communication control method according to claim 5, wherein the communication section, in case of the direct connection, causes its own terminal to function as a wireless LAN access point or requests the other-end terminal to function as a wireless LAN access point.

8. The communication control method according to claim 5, wherein the acquisition section acquires the security function information and the connection information on the other-end terminal through the access point or through another communication section different from the wireless LAN system.

9. A wireless LAN (Local Area Network) system including at least one access point and a plurality of wireless LAN communication terminals, wherein a wireless LAN communication terminal includes:
an acquisition section that, when an other-end wireless LAN communication terminal on another end of communication has connected to the access point, acquiring from the other-end terminal security function information about security functions of the other-end terminal and current connection information about a current connection between the other-end terminal and the access point;
a selection section that compares the security function information and the current connection information on the other-end terminal with a security policy of its own terminal and, based on results of the comparisons, selects either a direct connection with the other-end terminal or a relay connection via the access point so that the security policy is met, wherein the relay connection includes the current connection and wherein when the current connection information meets the security policy, the selection section selects the relay connection and, when the current connection information does not meet the security policy, selects the direct connection or the relay connection using one of the security functions of the other-end terminal that meets the security policy; and
a communication section that performs communication with the other-end terminal by using the selected connection.

10. The wireless LAN system according to claim 9, wherein when the connection information does not meet the security policy, the relay connection is selected, using those of security functions of the access point and the security functions of the other-end terminal that meet the security policy.

11. The wireless LAN system according to claim 9, wherein the communication section, in case of the direct connection, causes its own terminal to function as a wireless LAN access point or requests the other-end terminal to function as a wireless LAN access point.

12. The wireless LAN system according to claim 9, wherein the acquisition section acquires the security function information and the connection information on the other-end terminal through the access point or through another communication section different from the wireless LAN system.

* * * * *